(12) United States Patent
Nishio

(10) Patent No.: US 9,952,104 B2
(45) Date of Patent: Apr. 24, 2018

(54) OPTICAL FIBER TEMPERATURE DISTRIBUTION MEASURING DEVICE

(71) Applicant: YOKOGAWA ELECTRIC CORPORATION, Musashino-shi, Tokyo (JP)

(72) Inventor: Yuuji Nishio, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 292 days.

(21) Appl. No.: 14/795,445

(22) Filed: Jul. 9, 2015

(65) Prior Publication Data

US 2016/0018272 A1    Jan. 21, 2016

(30) Foreign Application Priority Data

Jul. 15, 2014    (JP) .................. 2014-145232

(51) Int. Cl.
G01K 15/00    (2006.01)
G01K 11/32    (2006.01)

(52) U.S. Cl.
CPC ............ G01K 11/32 (2013.01); G01K 15/005 (2013.01); *G01K 2011/324* (2013.01)

(58) Field of Classification Search
CPC combination set(s) only.
See application file for complete search history.

(56) References Cited

U.S. PATENT DOCUMENTS

| 6,411,430 B1* | 6/2002 | Ogino | H01S 3/06758 |
| | | | 359/337.11 |
| 2008/0068586 A1* | 3/2008 | Kishida | G01B 11/18 |
| | | | 356/32 |
| 2010/0128756 A1* | 5/2010 | Lee | G01K 11/32 |
| | | | 374/161 |
| 2013/0156066 A1* | 6/2013 | Kwon | G01K 11/32 |
| | | | 374/161 |

FOREIGN PATENT DOCUMENTS

JP    5-264370 A    10/1993

* cited by examiner

*Primary Examiner* — Lisa Caputo
*Assistant Examiner* — Nasir U Ahmed
(74) *Attorney, Agent, or Firm* — Sughrue Mion, PLLC

(57) ABSTRACT

An optical fiber temperature distribution measuring device includes: an optical fiber as a sensor; a light source for outputting, to the optical fiber, signal light which has been amplified by excitation light; a temperature distribution calculation unit for measuring a temperature distribution along the optical fiber by using backward Raman scattered light from the optical fiber; an ASE light intensity variation measurement unit for measuring an intensity variation of an ASE light generated at the light source; and a temperature distribution correction unit for correcting the temperature distribution based on a measurement result of the ASE light intensity variation measurement unit.

7 Claims, 6 Drawing Sheets

— TEMPERATURE MEASUREMENT
DISTANCE RANGE: 50 km

OPTICAL FIBER TEMPERATURE DISTRIBUTION MEASURING DEVICE

CROSS-REFERENCE TO RELATED APPLICATION

This application claims priority from Japanese Patent Application No. 2014-145232 filed with the Japan Patent Office on Jul. 15, 2014, the entire content of which is hereby incorporated by reference.

BACKGROUND

1. Technical Field

An embodiment of the present disclosure relates to an optical fiber temperature distribution measuring device using an optical fiber as a sensor.

2. Description of the Related Art

Optical fiber temperature distribution measuring devices that are described in JP-A-5-264370 are a type of distributed measuring devices using an optical fiber as a sensor. The optical fiber temperature distribution measuring device is configured to measure a temperature distribution along the optical fiber. This technique utilizes backscattered light occurring inside an optical fiber. Note that an optical fiber temperature distribution measuring device is also referred to as a DTS (Distributed Temperature Sensor) as necessary in the description below.

Types of backscattered light include Rayleigh scattered light, Brillouin scattered light, Raman scattered light, and the like. Temperature measurements utilize backward Raman scattered light, which has a high temperature dependence. A temperature measurement is performed through wavelength separation of the backward Raman scattered light. Backward Raman scattered light includes anti-Stokes light AS whose wavelength is shorter than that of incident light, and Stokes light ST whose wavelength is longer than that of incident light.

An optical fiber temperature distribution measuring device measures the intensity Ias of anti-Stokes light and the intensity Ist of Stokes light to calculate the temperature based on the intensity ratio therebetween, and further produces and displays the temperature distribution along the optical fiber. Optical fiber temperature distribution measuring devices have been used in fields such as temperature control in plant facilities, disaster prevention-related investigations and researches, air-conditioning for power plants and large buildings, and the like.

SUMMARY

An optical fiber temperature distribution measuring device includes: an optical fiber as a sensor; a light source for outputting, to the optical fiber, signal light which has been amplified by excitation light; a temperature distribution calculation unit for measuring a temperature distribution along the optical fiber by using backward Raman scattered light from the optical fiber; an ASE light intensity variation measurement unit for measuring an intensity variation of an ASE light generated at the light source; and a temperature distribution correction unit for correcting the temperature distribution based on a measurement result of the ASE light intensity variation measurement unit.

DESCRIPTION OF THE EMBODIMENTS

Figure 1:
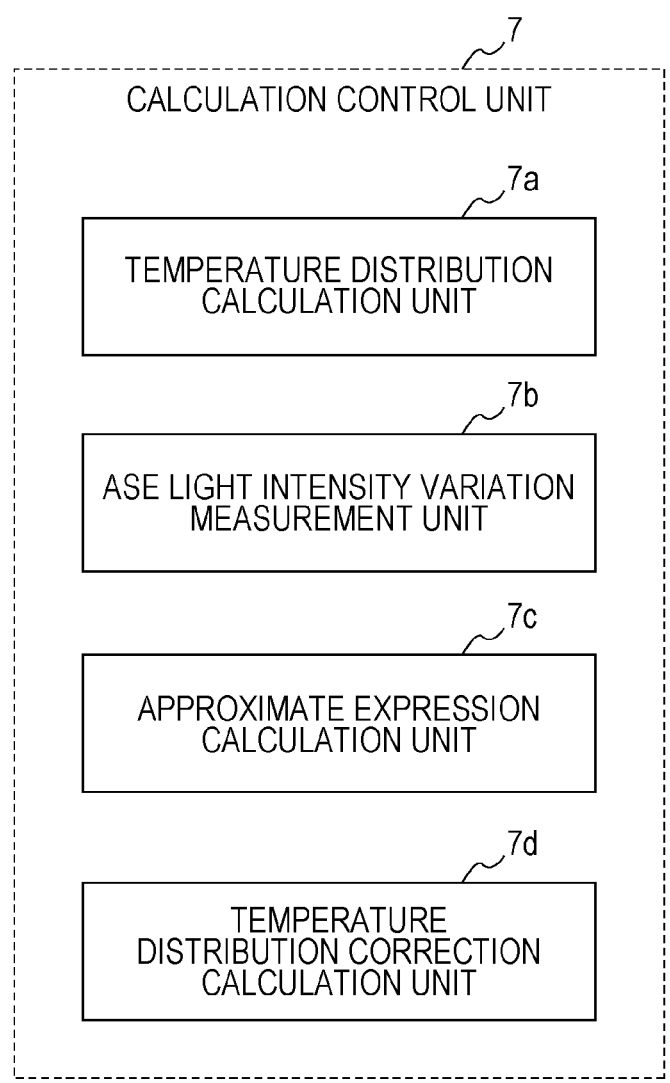
FIG. 1 is a block diagram showing a calculation control unit (main unit) of an optical fiber temperature distribution measuring device according to an embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 6:
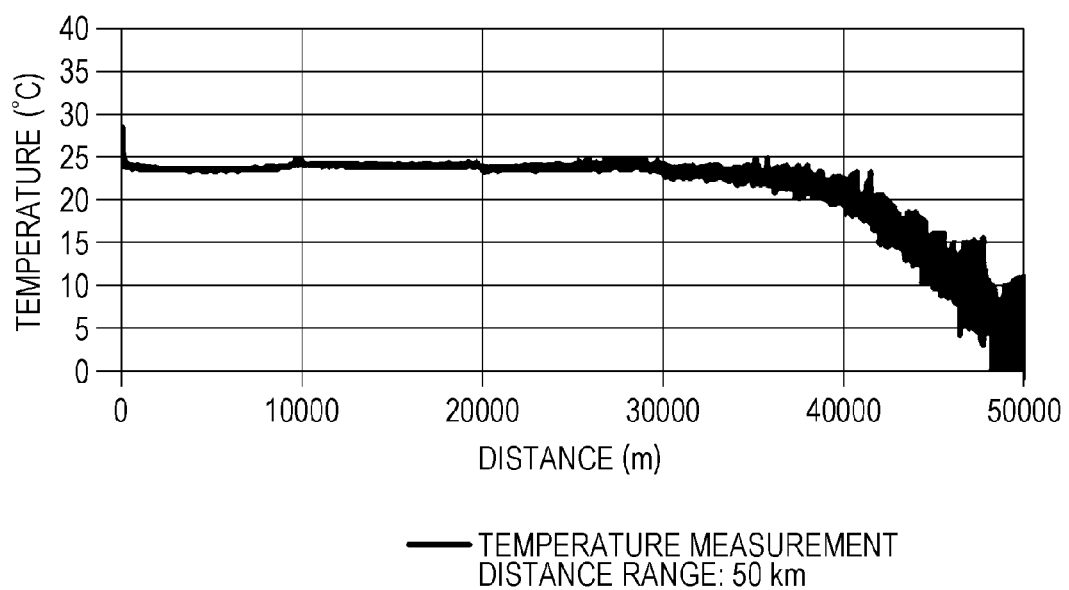
FIG. 6 is a graph showing an example temperature distribution characteristic measured by an ordinary DTS.

FIG. 6 is a graph showing an example temperature distribution characteristic measured by an ordinary DTS. The temperature measurement distance range of the DTS is 50 km. The temperature reference unit is kept at a constant temperature of 25° C. The temperature distribution characteristic is measured using a standard measurement period. No compensation process for removing the influence of ASE light is performed. The measurement result of FIG. 6 clearly shows that the measured temperature significantly drops past 30 km.

As the distance of the optical fiber for performing the temperature measurement increases, the signal light intensity is increased so as to increase the SN ratio. With laser diodes that are used as the light source, it is difficult to obtain a sufficient signal light intensity for long-distance temperature measurements. Therefore, the output light from the light source is typically amplified through an optical amplifier and then input to the optical fiber.

Excitation light is used for amplifying the output light from the light source (signal light) through an optical amplifier. When excitation light is input to an optical amplifier, the optical amplifier becomes excited to generate ASE light of the same wavelength as that of the optical signal.

However, the excitation time for exciting the optical amplifier is relatively long, i.e., tens of milliseconds. Therefore, it is difficult to properly turn the excitation light ON/OFF.

Figure 7:
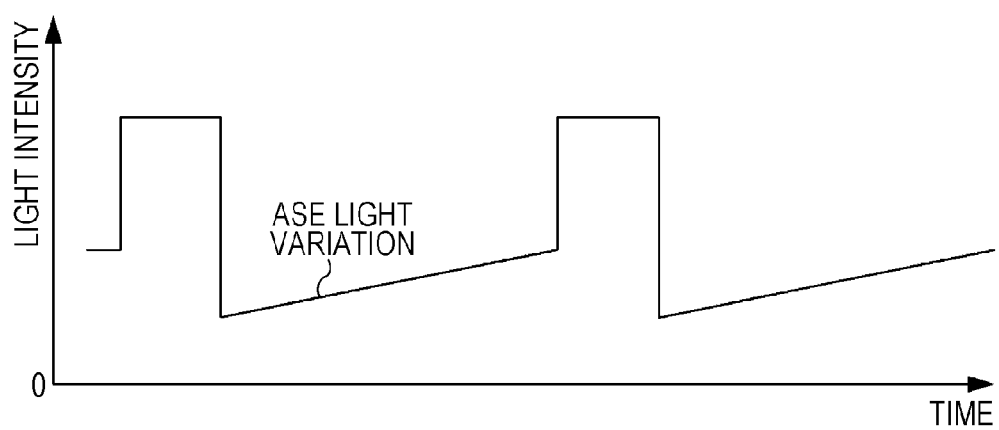
FIG. 7 is a graph showing an example intensity characteristic of signal light amplified through and output from an optical amplifier.

FIG. 7 is a graph showing an example intensity characteristic of signal light amplified through and output from an optical amplifier. When signal light (signal pulsed light) is input to an excited optical amplifier, the signal pulsed light is amplified. Then, the zero level of the ASE light increases monotonously. Thus, the intensity of the ASE light varies.

Backward Raman scattered light used in the temperature distribution measurement occurs based on the signal light and the ASE light. Therefore, if the intensity of the ASE light varies, it is difficult to properly perform the temperature distribution measurement.

It is difficult to cut off, by using a filter, for example, the ASE light having the same wavelength as that of the signal light.

An object of the present disclosure is to provide an optical fiber temperature distribution measuring device capable of obtaining a correct temperature distribution measurement result by correcting the influence of the ASE light intensity variation.

An optical fiber temperature distribution measuring device (the present measurement device) according to one embodiment of the present disclosure includes: an optical fiber as a sensor; a light source for outputting, to the optical fiber, signal light which has been amplified by excitation light; a temperature distribution calculation unit for measuring a temperature distribution along the optical fiber by using backward Raman scattered light from the optical fiber; an ASE light intensity variation measurement unit for measuring an intensity variation of an ASE light generated at the light source; and a temperature distribution correction unit for correcting the temperature distribution based on a measurement result of the ASE light intensity variation measurement unit.

In the present measurement device, the ASE light intensity variation measurement unit may measure the intensity variation of the ASE light by measuring backward Raman scattered light corresponding to a position that is beyond a length of the optical fiber.

The present measurement device further includes an approximate expression calculation unit for calculating an approximate expression for flattening a variation of a zero level of the ASE light based on the measurement result of the ASE light intensity variation measurement unit. The temperature distribution correction unit may perform a correction calculation for flattening the variation of the zero level of the ASE light on the temperature distribution calculated by the temperature distribution calculation unit by using the approximate expression.

With the present measurement device, the influence of the intensity variation of the ASE light output from the light source can be removed or reduced from the temperature distribution measurement result. Thus, it is possible to obtain a correct temperature distribution measurement result.

An embodiment of the present disclosure will now be described in detail with reference to the drawings.

Figure 5:
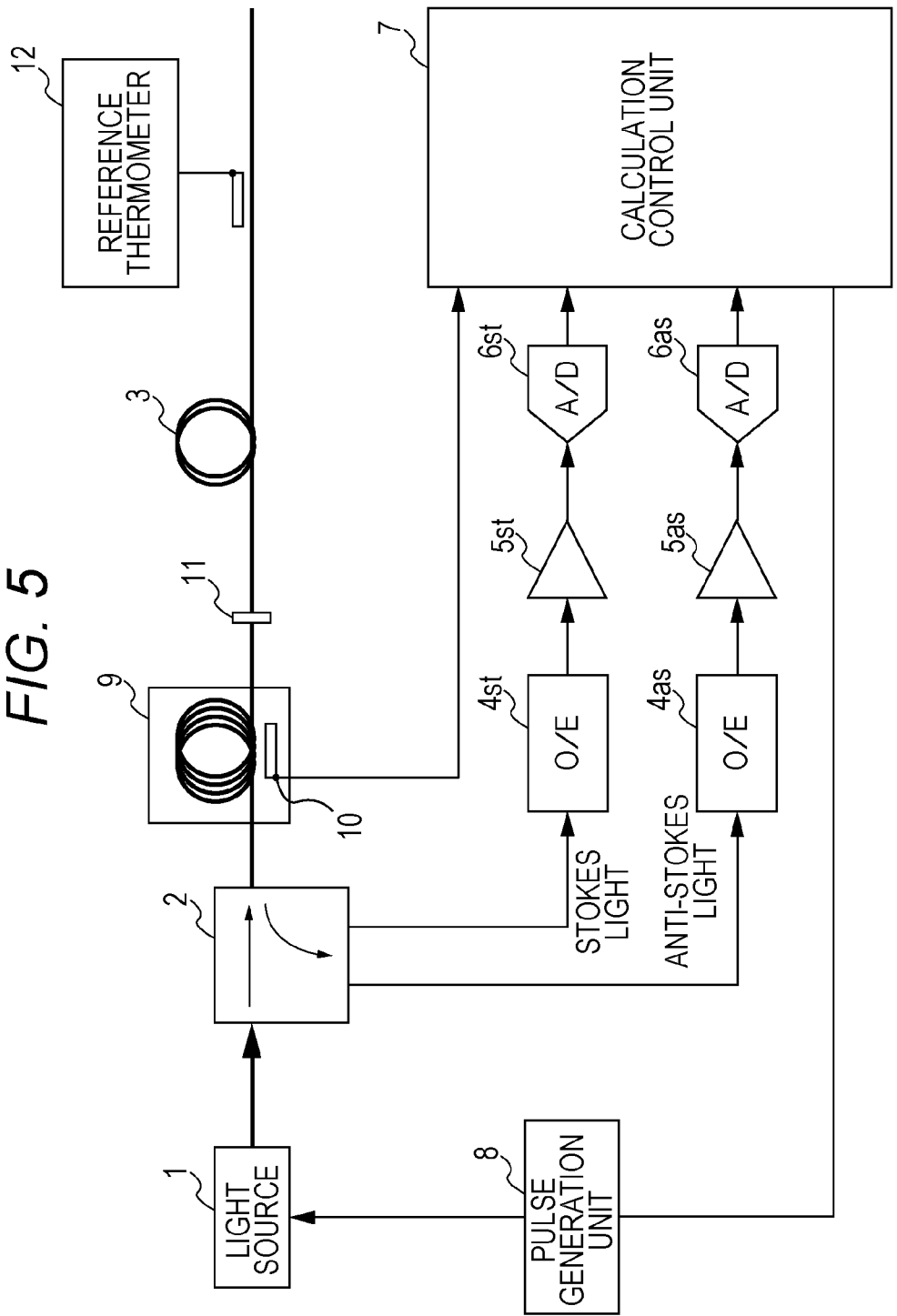
FIG. 5 is a block diagram showing a configuration of an optical fiber temperature distribution measuring device according to an embodiment.

FIG. 5 is a block diagram showing a configuration of an optical fiber temperature distribution measuring device of the present embodiment (the present measurement device). As shown in FIG. 5, the present measurement device includes a light source 1, an optical branching device 2, an optical fiber 3, an optoelectronic converter (hereinafter referred to as an O/E converter) 4st, an O/E converter 4as, an amplifier 5st, an amplifier 5as, an A/D converter 6st, an A/D converter 6as, a calculation control unit 7, a pulse generation unit 8, a temperature reference unit 9, a thermometer 10, a connector connection unit 11, and a reference thermometer 12.

The light source 1 is connected to the input end of the optical branching device 2. The optical fiber 3 as a temperature sensor is connected to the input/output end of the optical branching device 2 via the temperature reference unit 9 and the connector connection unit 11. The O/E converter 4st is connected to one output end of the optical branching device 2. The O/E converter 4as is connected to the other output end of the optical branching device 2.

The output terminal of the O/E converter 4st is connected to the calculation control unit 7 through the amplifier 5st and the A/D converter 6st. The output terminal of the O/E converter 4as is connected to the calculation control unit 7 through the amplifier 5as and the A/D converter 6as. Note that the calculation control unit 7 is connected to the light source 1 through the pulse generation unit 8.

The light source 1 may be a laser diode, for example. The light source 1 outputs pulsed light corresponding to the timing signal from the calculation control unit 7, which is input through the pulse generation unit 8. The optical branching device 2 has an input end, an input/output end, and two output ends. The input end of the optical branching device 2 receives pulsed light output from the light source 1. The input/output end of the optical branching device 2 outputs pulsed light toward the optical fiber 3. The input/output end of the optical branching device 2 also receives backward Raman scattered light occurring inside the optical fiber 3. The optical branching device 2 performs wavelength separation of the received backward Raman scattered light into Stokes light ST and anti-Stokes light AS. The input end of the optical fiber 3 receives pulsed light output from the optical branching device 2. The backward Raman scattered light occurring inside the optical fiber 3 is output from the input end of the optical fiber 3 toward the optical branching device 2.

The O/E converters 4st and 4as may be photodiodes, for example. The O/E converter 4st receives the Stokes light ST output from one output end of the optical branching device 2. The O/E converter 4as receives the anti-Stokes light AS output from the other output end of the optical branching device 2. The O/E converters 4st and 4as each output an electrical signal corresponding to the incident light.

The amplifiers 5st and 5as amplify electrical signals output from the O/E converters 4st and 4as, respectively. The A/D converters 6st and 6as convert signals output from the amplifiers 5st and 5as into digital signals.

The calculation control unit 7 calculates the temperature from the intensity ratio between two components of the backward Raman scattered light, i.e., the intensity ratio between the Stokes light ST and the anti-Stokes light AS based on the digital signals output from the A/D converters 6st and 6as. The calculation control unit 7 also identifies the point at which the backward Raman scattered light has occurred based on the time when the digital signal is received according to the backward Raman scattered light. Moreover, the calculation control unit 7 obtains the temperature distribution along the optical fiber 3 based on the calculated temperature and the identified point at which the backward Raman scattered light has occurred. Moreover, the calculation control unit 7 displays the obtained temperature distribution on a display (not shown). Note that the relationship between the intensity ratio and the temperature is pre-stored in the calculation control unit 7 in the form of a table or formulas. The calculation control unit 7 sends a timing signal to the light source 1 in order to control the timing for outputting an optical pulse from the light source 1.

The temperature reference unit 9, including tens of meters of a wound optical fiber, is provided between the optical branching device 2 and the optical fiber 3 via the connector connection unit 11. The temperature reference unit 9 is provided with the thermometer 10 including a platinum resistance temperature sensor, for example, for measuring the actual temperature. The output signal of the thermometer 10 is input to the calculation control unit 7. Note that the reference thermometer 12 including a platinum resistance temperature sensor, for example, for measuring the actual temperature is also provided in the vicinity of the optical fiber 3 used as a temperature sensor.

The principle of the temperature distribution measurement will be described. Assume that the signal intensities of the Stokes light ST and the anti-Stokes light AS are each represented by a function of time with respect to a point in time at which light is emitted from the light source 1. Since the speed of light through the optical fiber 3 is known, this function can be substituted with a function of distance along the optical fiber 3 with respect to the light source 1. That is, this function can be regarded as being a function where the horizontal axis represents the distance and the vertical axis the intensities of the Stokes light ST and the anti-Stokes light AS occurring at different distance positions along the optical fiber, i.e., a distance distribution.

On the other hand, the anti-Stokes light intensity Ias and the Stokes light intensity Ist are both dependent on the temperature of the optical fiber 3. Moreover, the intensity ratio Ias/Ist therebetween is also dependent on the temperature of the optical fiber 3. Therefore, once the intensity ratio Ias/Ist is known, it is possible to know the position at which the backward Raman scattered light has occurred. Now, the intensity ratio Ias/Ist is a function of the distance x, i.e., Ias(x)/Ist(x). Therefore, it is possible to obtain the temperature distribution T(x) along the optical fiber 3 based on the intensity ratio Ias(x)/Ist(x).

FIG. 1 is a block diagram showing a main unit of the present measurement device (the calculation control unit 7 shown in FIG. 5). As shown in FIG. 1, the calculation control unit 7 includes a temperature distribution calculation unit 7a, an ASE light intensity variation measurement unit 7b, an approximate expression calculation unit 7c, and a temperature distribution correction calculation unit (temperature distribution correction unit) 7d.

The temperature distribution calculation unit 7a measures the temperature distribution along the optical fiber 3 by using the backward Raman scattered light from the optical fiber 3. The temperature distribution calculation unit 7a performs an ordinary calculation for obtaining the temperature distribution along the optical fiber 3.

The ASE light intensity variation measurement unit 7b measures the intensity variation of the ASE light output from the light source 1. For example, the ASE light intensity variation measurement unit 7b measures the backward Raman scattered light from an area where the optical fiber 3 is not routed (an area where the optical fiber is absent). Thus, the ASE light intensity variation measurement unit 7b measures the intensity variation (the value of the intensity variation component) of the ASE light occurring in an optical amplifier 15 (see FIG. 8) (the ASE light output from the light source 1).

Figure 8:
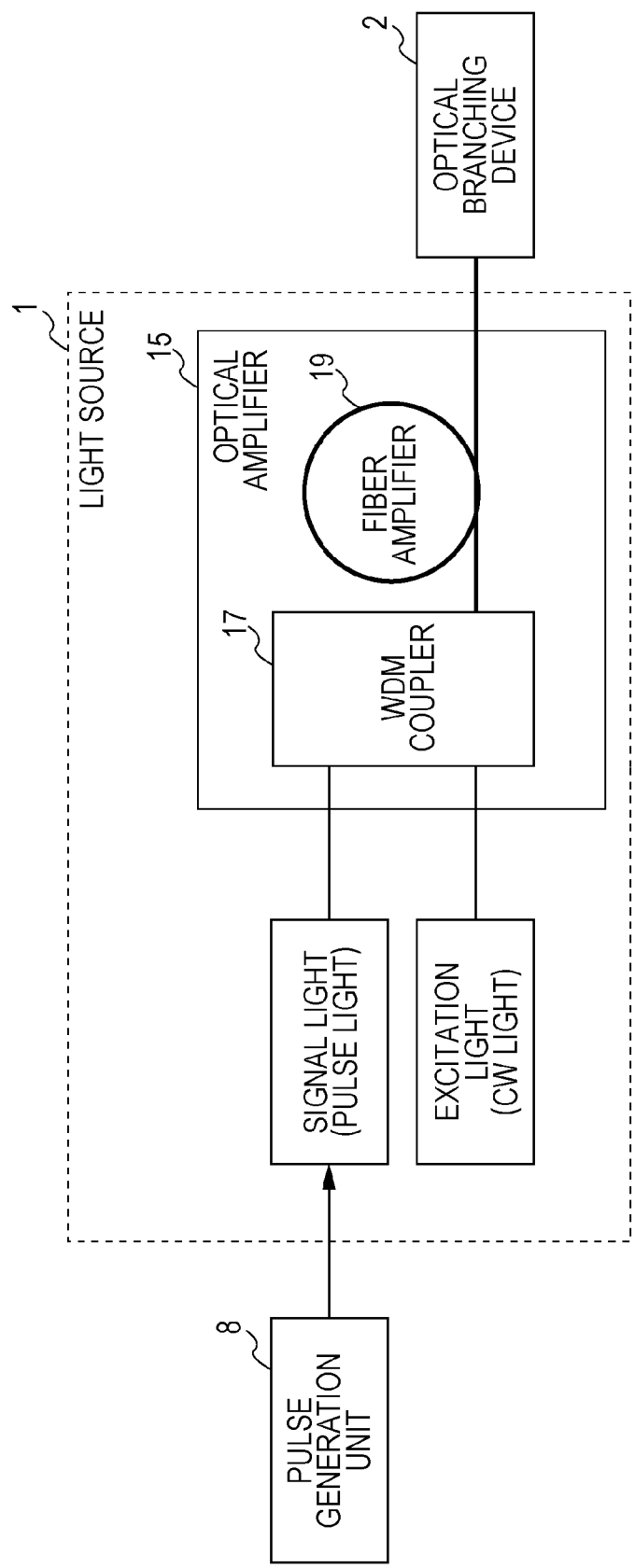
FIG. 8 is a diagram showing in detail a light source of an optical fiber temperature distribution measuring device according to an embodiment.

FIG. 8 is a diagram showing in detail the light source 1 of the present measurement device (a conceptual diagram showing the internal structure of the light source 1). As shown in this figure, the light source 1 includes the optical amplifier 15. The optical amplifier 15 includes a WDM optical coupler 17 and a fiber amplifier 19. The WDM optical coupler 17 couples together the signal light from the pulse generation unit 8 (pulsed light) and the excitation light which is a DC component (CW light) so as to output the obtained light to the optical branching device 2 via a fiber amplifier 19. Thus, a signal light (pulsed light) having intensity that has been amplified by the CW light is output from the light source 1. Note that since the ASE light is a DC component, the light source 1 continues to output the ASE light irrespective of the presence or absence of the pulsed light. Hereinafter, "to measure the backward Raman scattered light from an area where the optical fiber 3 is not routed" will now be explained. As described above, light output from the light source 1 to the optical fiber 3 via the optical branching device 2 includes pulsed light and ASE light for amplifying the intensity of the pulsed light.

The pulsed light travels along the optical fiber 3 while generating backward Raman scattered light. Therefore, the position (distance) at which the backward Raman scattered light is generated can be known by measuring the return time of the backward Raman scattered light corresponding to the pulsed light (the amount of time from the pulse emittance to the reception of the backward Raman scattered light). If the pulsed light goes out of the optical fiber 3, the backward Raman scattered light corresponding to the pulsed light is not generated, and the level thereof accordingly becomes zero. That is, the level of the backward Raman scattered light corresponding to the pulsed light is zero at a return time corresponding to a position that is beyond the length of the optical fiber 3 (a return time corresponding to a position that is beyond the farthest end of the optical fiber 3).

On the other hand, the ASE light is a DC component, and continuously irradiates the optical fiber 3. The optical branching device 2 continuously receives the backward Raman scattered light of the ASE light, irrespective of the return time of the backward Raman scattered light corresponding to the pulsed light. Therefore, at a return time corresponding to a position that is beyond the length of the optical fiber 3, the optical branching device 2 receives (DC) backward Raman scattered light corresponding to the ASE light, which does not include the backward Raman scattered light of the pulsed light.

That is, the phrase "the ASE light intensity variation measurement unit 7b measures the backward Raman scattered light from an area where the optical fiber 3 is not routed" means that the ASE light intensity variation measurement unit 7b measures the backward Raman scattered light at a return time corresponding to a position that is farther beyond the length of the optical fiber 3 such that the backward Raman scattered light corresponding to the ASE light, which does not include the backward Raman scattered light of the pulsed light, is obtained.

Thus, the ASE light intensity variation measurement unit 7b measures the backward Raman scattered light corresponding to a position that is beyond the length of the optical fiber 3. That is, the ASE light intensity variation measurement unit 7b measures the backward Raman scattered light at a return time corresponding to a position that is beyond the length of the optical fiber 3 (i.e., the backward Raman scattered light corresponding to the ASE light, which does not include the backward Raman scattered light corresponding to the pulsed light). Thus, the ASE light intensity variation measurement unit 7b measures the intensity variation (the value of the intensity variation component) of the ASE light generated at the optical amplifier 15 (the ASE light output from the light source 1).

The approximate expression calculation unit 7c calculates an approximate expression for flattening the monotonous increase of the zero level of the ASE light shown in FIG. 7 based on the measurement result of the ASE light intensity variation measurement unit 7b.

The temperature distribution correction calculation unit 7d corrects the temperature distribution obtained by the temperature distribution calculation unit 7a based on the measurement result of the ASE light intensity variation measurement unit 7b. For example, the temperature distribution correction calculation unit 7d performs a correction calculation for flattening the monotonous increase of the zero level of the ASE light on the temperature distribution calculated by the temperature distribution calculation unit 7a (the temperature distribution calculation result) by using the approximate expression calculated by the approximate expression calculation unit 7c.

Figure 2:
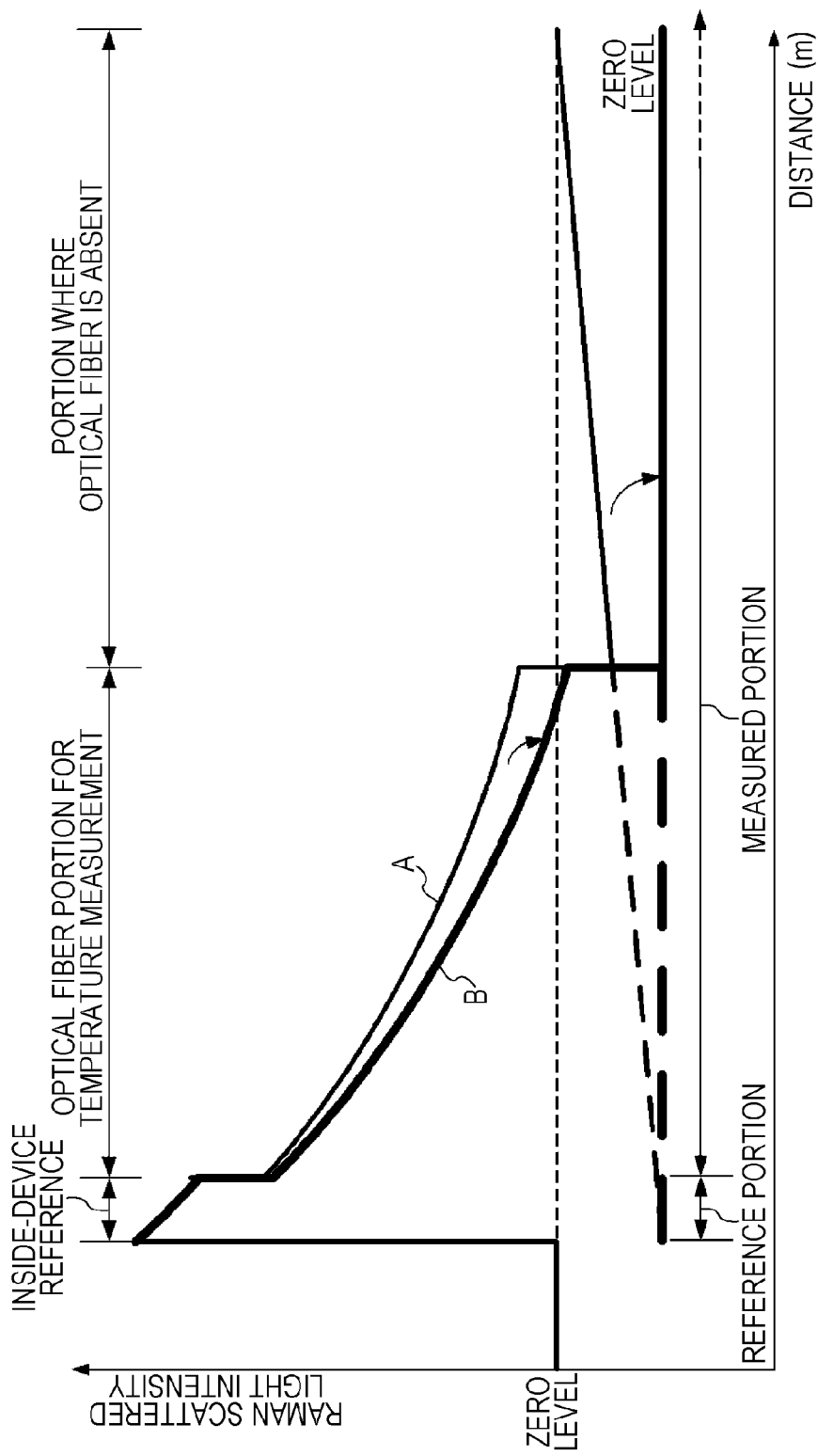
FIG. 2 is a graph showing an example measurement of a backward Raman scattered light intensity characteristic.

FIG. 2 is a graph showing an example measurement of a backward Raman scattered light intensity characteristic. In FIG. 2, characteristic curve A represents an example measurement of the uncorrected backward Raman scattered light intensity characteristic including the ASE light intensity variation component. Characteristic curve B represents an example measurement of the corrected backward Raman scattered light intensity characteristic from which the influence of the ASE light intensity variation component has been removed (or reduced).

Characteristic curve A contains therein the monotonous increase of the zero level corresponding to the variation of the ASE light. On the other hand, the zero level of characteristic curve B is flat. This indicates that the intensity of the ASE light does not vary but remains constant.

Figure 3:
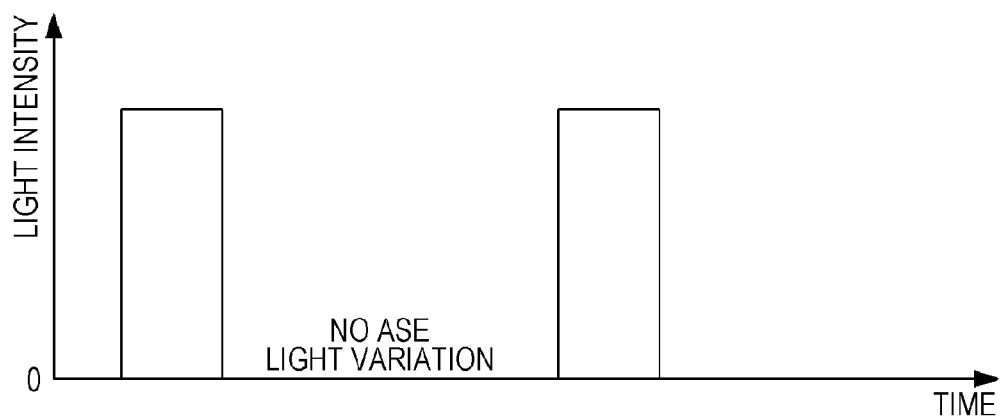
FIG. 3 is a graph showing an example intensity characteristic of signal light amplified through an optical amplifier and output from a light source.

FIG. 3 is a graph showing an example intensity characteristic of signal light amplified through the optical amplifier 15 and output from the light source 1. FIG. 3 shows an ideal state where the intensity of the ASE light does not vary but is kept at a constant value. Where the signal light is output from the light source 1 as shown in FIG. 3, the intensity of the ASE light remains constant, and it is therefore not necessary to correct the variation of the ASE light, thereby realizing an efficient temperature measurement.

Figure 4:
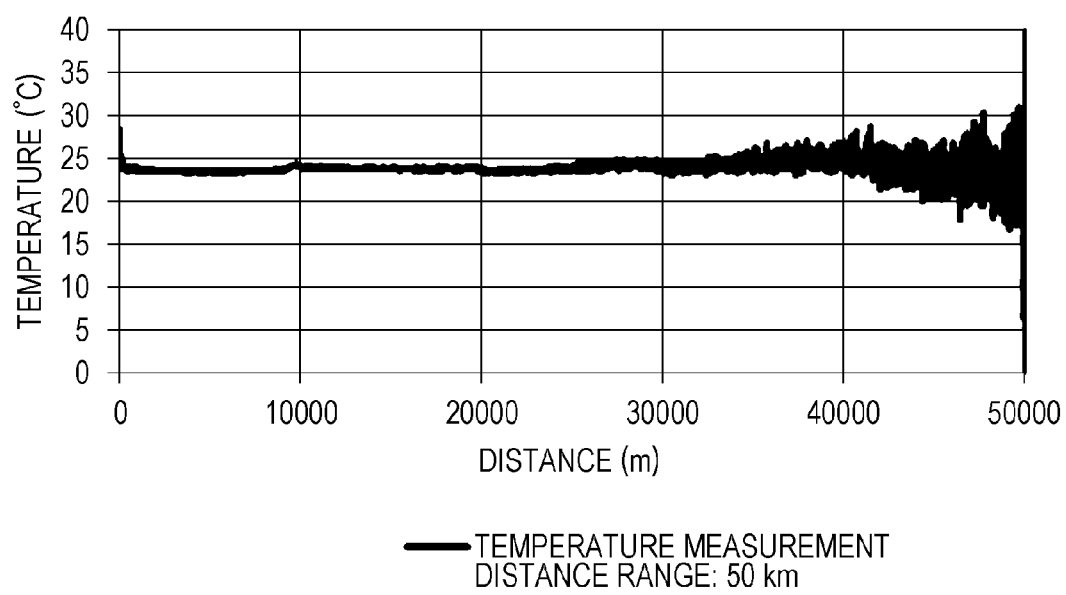
FIG. 4 is a graph showing an example temperature distribution characteristic measured by an optical fiber temperature distribution measuring device according to an embodiment.

FIG. 4 is a graph showing an example temperature distribution characteristic measured by the present measurement device. As is clear from FIG. 4, the measured temperature does not significantly drop even past 30 km. Therefore, with the present measurement device, it is possible to obtain stable temperature measurement results over wider measurement ranges than with conventional techniques.

As described above, with the present measurement device, it is possible to obtain correct temperature distribution measurement results by correcting the influence of the ASE light intensity variation.

An embodiment of the present disclosure can be said to relate to an optical fiber temperature distribution measuring device using an optical fiber as a sensor, and specifically to a compensation process for removing the influence of the ASE (Amplified Spontaneous Emission) light on the temperature measurement result.

The calculation control unit 7 may calculate the temperature from the intensity ratio between two components of backscattered light, i.e., the Stokes light ST and the anti-Stokes light AS, based on the digital signals output from the A/D converters 6st and 6as, and may display, on a display means (not shown), the temperature distribution along the optical fiber 3 obtained based on time-series data of the calculated temperature.

The optical fiber temperature distribution measuring device of the present embodiment may be any of first to third optical fiber temperature distribution measuring devices below.

A first optical fiber temperature distribution measuring device is an optical fiber temperature distribution measuring device using an optical fiber as a sensor, the optical fiber temperature distribution measuring device configured to measure a temperature distribution along the optical fiber by utilizing Raman backscattered light, which is generated as output light from a light source is amplified through an optical amplifier and input to the optical fiber, the optical fiber temperature distribution measuring device including: ASE light intensity variation measurement means for measuring an ASE light intensity variation which is generated at the optical amplifier; and temperature distribution measurement result correction means for correcting a temperature distribution measurement result utilizing the Raman backscattered light based on a measurement result of the ASE light intensity variation measurement means.

In a second optical fiber temperature distribution measuring device according to the first optical fiber temperature distribution measuring device, a value of an intensity variation component of the ASE light which is generated at the optical amplifier is measured by measuring Raman scattered light in an area where the optical fiber is not routed.

A third optical fiber temperature distribution measuring device is according to the first or second optical fiber temperature distribution measuring device, including means for calculating an approximate expression for flattening a variation of a zero level based on the measurement result of the Raman scattered light.

With the first to third optical fiber temperature distribution measuring devices, it is possible to remove the influence of the ASE light intensity variation, which is generated at the optical amplifier, from the temperature distribution measurement result, and to obtain a correct temperature distribution measurement result.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. An optical fiber temperature distribution measuring device comprising:
   an optical fiber as a sensor;
   a light source for outputting, to the optical fiber, signal light which has been amplified by excitation light;
   a temperature distribution calculation unit for measuring a temperature distribution along the optical fiber by using backward Raman scattered light from the optical fiber;
   an amplified spontaneous emission (ASE) light intensity variation measurement unit for measuring an intensity variation of an ASE light generated at the light source by measuring backward Raman scattered light corresponding to the ASE light; and
   a temperature distribution correction unit for correcting the temperature distribution based on a measurement result of the intensity variation of the ASE light.

2. The optical fiber temperature distribution measuring device according to claim 1, wherein
   the ASE light intensity variation measurement unit measures the backward Raman scattered light corresponding to a position that is beyond a length of the optical fiber.

3. The optical fiber temperature distribution measuring device according to claim 2, further comprising an approximate expression calculation unit for calculating an approximate expression for flattening a variation of a zero level of the ASE light based on the measurement result of the ASE light intensity variation measurement unit, wherein the temperature distribution correction unit performs a correction calculation for flattening the variation of the zero level of the ASE light on the temperature distribution calculated by the temperature distribution calculation unit by using the approximate expression.

4. The optical fiber temperature distribution measuring device according to claim 1, further comprising an approximate expression calculation unit for calculating an approximate expression for flattening a variation of a zero level of the ASE light based on the measurement result of the ASE light intensity variation measurement unit, wherein the temperature distribution correction unit performs a correction calculation for flattening the variation of the zero level of the ASE light on the temperature distribution calculated by the temperature distribution calculation unit by using the approximate expression.

5. The optical fiber temperature distribution measuring device according to claim 1, wherein the ASE light intensity variation measurement unit measures the intensity variation of the ASE light by measuring the intensity variation of the ASE light occurring at an optical amplifier.

6. The optical fiber temperature distribution measuring device according to claim 1, wherein the backward Raman scattered light corresponding to the ASE light does not include backward Raman scattered light corresponding to the signal light.

7. The optical fiber temperature distribution measuring device according to claim 1, wherein the ASE light intensity variation measurement unit measures the backward Raman scattered light of the ASE light corresponding to a position beyond a length of the optical fiber in which backward scattered light corresponding to the signal light is not generated.

* * * * *